United States Patent
Jayachandran et al.

(10) Patent No.: US 8,972,971 B2
(45) Date of Patent: Mar. 3, 2015

(54) IMAGE INSTANCE MAPPING

(75) Inventors: Praveen Jayachandran, Karnataka (IN); Ravi Kothari, New Delhi (IN); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/570,376

(22) Filed: Aug. 9, 2012

(65) Prior Publication Data

US 2014/0047436 A1 Feb. 13, 2014

(51) Int. Cl.
*G06F 9/44* (2006.01)
*G06F 9/455* (2006.01)

(52) U.S. Cl.
CPC .................................. *G06F 9/45558* (2013.01)
USPC ............................... 717/170; 718/104; 718/1

(58) Field of Classification Search
CPC .............. G06F 9/455–9/45558; G06F 9/5077; G06F 2009/45533–2009/4557; G06F 2009/45595
USPC ...................................... 717/170; 718/1–108
See application file for complete search history.

(56) References Cited

U.S. PATENT DOCUMENTS

| | | | |
|---|---|---|---|
| 7,426,721 B1 * | 9/2008 | Saulpaugh et al. ............ | 717/144 |
| 7,716,377 B2 * | 5/2010 | Harris et al. ................... | 709/248 |
| 8,161,321 B2 * | 4/2012 | Zheng et al. .................... | 714/15 |
| 8,199,656 B1 * | 6/2012 | Kirtley et al. .................. | 370/241 |
| 8,402,004 B2 * | 3/2013 | Provenzano et al. ......... | 707/692 |
| 8,671,228 B1 * | 3/2014 | Lok et al. ........................ | 710/19 |
| 8,707,287 B2 * | 4/2014 | Raundahl Gregersen et al. ............................. | 717/168 |
| 2004/0019669 A1 * | 1/2004 | Viswanath et al. ........... | 709/223 |
| 2004/0260715 A1 * | 12/2004 | Mongeon et al. ............. | 707/101 |
| 2005/0246699 A1 * | 11/2005 | Lagergren ..................... | 717/153 |
| 2006/0271575 A1 * | 11/2006 | Harris et al. ................... | 707/100 |
| 2006/0271931 A1 * | 11/2006 | Harris et al. ....................... | 718/1 |
| 2007/0088762 A1 * | 4/2007 | Harris et al. ................... | 707/201 |
| 2008/0201709 A1 * | 8/2008 | Hodges ............................. | 718/1 |
| 2009/0150885 A1 * | 6/2009 | Safari et al. ....................... | 718/1 |
| 2011/0047548 A1 | 2/2011 | Traut | |
| 2011/0072430 A1 | 3/2011 | Mani | |
| 2011/0072431 A1 | 3/2011 | Cable et al. | |
| 2011/0113467 A1 | 5/2011 | Agarwal et al. | |
| 2011/0167473 A1 * | 7/2011 | Evans et al. ....................... | 726/1 |
| 2011/0179040 A1 * | 7/2011 | Bessonov et al. ............. | 707/747 |
| 2011/0283256 A1 * | 11/2011 | Raundahl Gregersen et al. ............................. | 717/108 |

(Continued)

OTHER PUBLICATIONS

Building a distributed search system with Apache Hadoop and Lucene - Mirko Calvaresi—Università di Roma—2012.*

(Continued)

*Primary Examiner* — Lewis A Bullock, Jr.
*Assistant Examiner* — Francisco Aponte
(74) *Attorney, Agent, or Firm* — Schmeisser, Olsen & Watts; John Pivnichny

(57) ABSTRACT

A method and system for image instance mapping is provided. The method includes receiving from change agents on virtual machine instances periodic monitoring data indicating changes for each virtual machine instance. The periodic monitoring data is analyzed and unique updates are applied to the virtual machine instances. High level semantic updates to the virtual machine instances are identified and updates associated with a golden master image are tracked. High level semantic updates to the golden master image are identified and in response, a version tree configured to track drift of each virtual machine instance with respect to golden master image is maintained.

18 Claims, 6 Drawing Sheets

(56) References Cited

U.S. PATENT DOCUMENTS

| | | | |
|---|---|---|---|
| 2012/0011503 A1* | 1/2012 | Filali-Adib et al. | 718/1 |
| 2012/0016904 A1* | 1/2012 | Mahajan et al. | 707/769 |
| 2012/0124046 A1* | 5/2012 | Provenzano | 707/737 |
| 2012/0124307 A1* | 5/2012 | Ashutosh et al. | 711/162 |
| 2012/0185499 A1* | 7/2012 | Alpern et al. | 707/769 |
| 2013/0125120 A1* | 5/2013 | Zhang et al. | 718/1 |
| 2013/0132946 A1* | 5/2013 | Ma | 718/1 |
| 2013/0152079 A1* | 6/2013 | Heyman et al. | 718/1 |
| 2013/0275968 A1* | 10/2013 | Petev et al. | 718/1 |
| 2013/0297753 A1* | 11/2013 | Lu | 709/220 |

OTHER PUBLICATIONS

Utilization of Dynamic Attributes in Resource Discovery for Network Virtualization—Heli Amarasinghe—Ottawa-Carlton Institute for Electrical and Computer Engineering University of Ottawa Ottawa, Canada May 2012.*

International Search Report and Written Opinion of the International Searching Authority; International Application No. PCT/IB2013/054814; Applicant's file reference IN120110; dated Nov. 21, 2013; 8 pages.

Davis et al., IBM SAP Joint White Paper: Backup/Recover APO liveCache with ESS FlashCopy, Jun. 24, 2003, 18 pages.

Lobay et al., Recovering shape and irradiance maps from rich dense texton fields, Proceedings of the 2004 IEEE Computer Society Conference on Computer Vision and Pattern Recognition (CVPR'04) 1063-6919/04, 7 pages.

Oracle VM Server for SPARC, Chapter 3, copyright 2011, pp. 77-111.

* cited by examiner

| Filename | Update ID | Append/Modify | Checksum | Location of backup file |
|---|---|---|---|---|
| ⋮ | ⋮ | A<br>M | | |
| Registry files | | M | | |

IMAGE INSTANCE MAPPING

FIELD

The present invention relates to a method and associated system for mapping a master image to multiple associated images.

BACKGROUND

Performing recovery function within a system typically comprises an inaccurate process with little flexibility. Recovering lost data may include a complicated process that may be time consuming and require a large amount of resources. Accordingly, there exists a need in the art to overcome at least some of the deficiencies and limitations described herein.

SUMMARY

The present invention provides a method comprising: receiving from a plurality of change agents on a plurality of virtual machine instances, by a computer processor executing an aggregator module of a mapping application, periodic monitoring data indicating changes for each virtual machine instance of the plurality of virtual machine instances; analyzing, by the computer processor executing the aggregator module, the periodic monitoring data; determining based on results of the analyzing, by the computer processor executing the aggregator module, unique updates applied to the plurality of virtual machine instances; first identifying, by the computer processor executing an instance update manager of the mapping application, first high level semantic updates to the plurality of virtual machine instances; tracking, by the computer processor executing a change agent of the mapping application, updates associated with a golden master image used to generate the plurality of virtual machine instances; second identifying, by the computer processor executing an image update manager of the mapping application, high level semantic updates to the golden master image; and maintaining in response to results of the first identifying, the tracking and the second identifying, by the computer processor executing a version manager of the mapping application, a version tree configured to track drift of each the virtual machine instance with respect to the golden master image.

The present invention provides a computer program product, comprising a computer readable storage device storing a computer readable program code, the computer readable program code comprising an algorithm that when executed by a computer processor of a computing system implements a method, the method comprising: receiving from a plurality of change agents on a plurality of virtual machine instances, by the computer processor executing an aggregator module of a mapping application, periodic monitoring data indicating changes for each virtual machine instance of the plurality of virtual machine instances; analyzing, by the computer processor executing the aggregator module, the periodic monitoring data; determining based on results of the analyzing, by the computer processor executing the aggregator module, unique updates applied to the plurality of virtual machine instances; first identifying, by the computer processor executing an instance update manager of the mapping application, first high level semantic updates to the plurality of virtual machine instances; tracking, by the computer processor executing a change agent of the mapping application, updates associated with a golden master image used to generate the plurality of virtual machine instances; second identifying, by the computer processor executing an image update manager of the mapping application, high level semantic updates to the golden master image; and maintaining in response to results of the first identifying, the tracking and the second identifying, by the computer processor executing a version manager of the mapping application, a version tree configured to track drift of each the virtual machine instance with respect to the golden master image.

The present invention provides a computer system comprising a computer processor coupled to a computer-readable memory unit, the memory unit comprising instructions that when executed by the computer processor implements a method comprising: receiving from a plurality of change agents on a plurality of virtual machine instances, by the computer processor executing an aggregator module of a mapping application, periodic monitoring data indicating changes for each virtual machine instance of the plurality of virtual machine instances; analyzing, by the computer processor executing the aggregator module, the periodic monitoring data; determining based on results of the analyzing, by the computer processor executing the aggregator module, unique updates applied to the plurality of virtual machine instances; first identifying, by the computer processor executing an instance update manager of the mapping application, first high level semantic updates to the plurality of virtual machine instances; tracking, by the computer processor executing a change agent of the mapping application, updates associated with a golden master image used to generate the plurality of virtual machine instances; second identifying, by the computer processor executing an image update manager of the mapping application, high level semantic updates to the golden master image; and maintaining in response to results of the first identifying, the tracking and the second identifying, by the computer processor executing a version manager of the mapping application, a version tree configured to track drift of each the virtual machine instance with respect to the golden master image.

The present invention advantageously provides a simple method and associated system capable of performing recovery function within a system.

BRIEF DESCRIPTION OF THE DRAWINGS

FIG. 3 illustrates an example of a hash table, in accordance with embodiments of the present invention.

DETAILED DESCRIPTION

Figure 1:
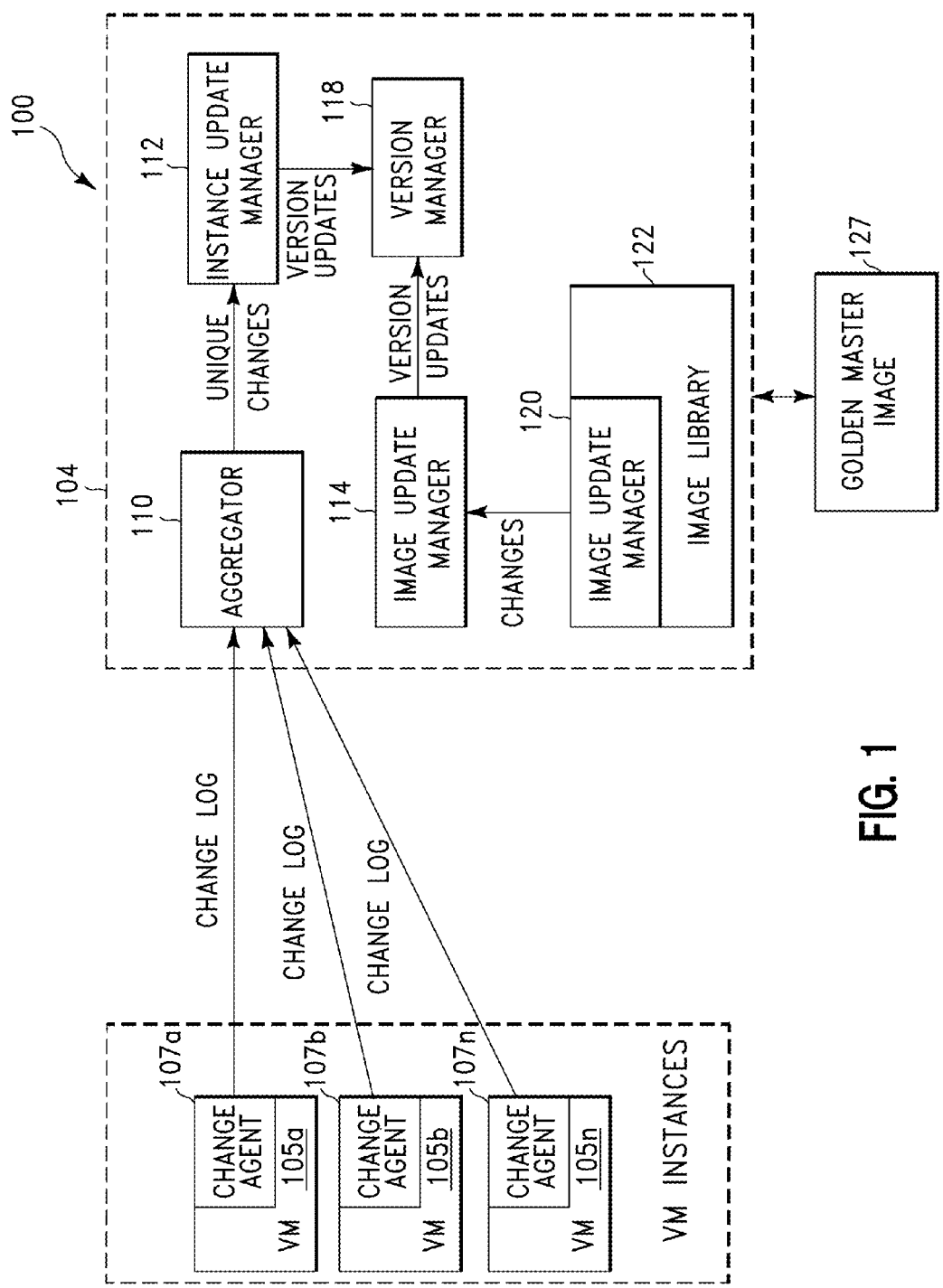
FIG. 1 illustrates a system for maintaining a bidirectional link between a golden master image and generated virtual machine (VM) instances, in accordance with embodiments of the present invention.

FIG. 1 illustrates a system 100 for maintaining a bidirectional link between a golden master image 127 and generated virtual machine (VM) instances 105a . . . 105n, in accordance with embodiments of the present invention. System 100 maintains a bidirectional link between golden master image 127 and VM instances 105a . . . 105n (i.e., via a mapping system 104) generated from golden master image 127 in order to manage VM instance drift caused by updates applied to golden master image 127 and/or VM instances 105a . . . 105n. In the event of a malfunction or deletion of any of VM instances 105a . . . 105n, replacement VM instances may be recreated from the golden master image 127 master and associated stored information associated with the drift of each of VM instances 105a . . . 105n. System 100 allows for:

1. Minimizing redundancy in a golden master image and VM instance mapping.
2. Elimination of duplication between a VM instance a golden master image.
3. Elimination of duplication across changes to multiple VM instances.

Each of VM instances 105a . . . 105n comprises a change agent (of change agents 107a . . . 107n) that periodically identifies all changed files within an associated one of VM instances 105a . . . 105n and transmits associated hashes to mapping system 104. Each change agent comprises configuration parameters configured to meet a recovery point objective (RPO) for a disaster recovery process (i.e., in the event that a VM instance is lost). The configuration parameters may include, inter alia, a period T and a scope. A period T may be defined as a period of time after which a change agent scans for changes (e.g., 1 hour). A scope may be defined as directories associated with a scope for change detection. A change agent may enable the following process for identifying changed files within a VM instance:

1. Starting from a root, a list (including all files changed within a last period T) is generated.
2. A recursive scan of all lower level directories is executed and the list is updated accordingly.
3. All changed files are sorted based on a time and location.
4. Hash files for all changed files are transmitted to mapping system 104.

Mapping system 104 comprises an aggregator module 110, an instance update manager module 112, an image update manager module 114, a version manager module 118, and an image library 122 (for storing golden master image 127) comprising an image change agent 120.

Aggregator module 110 aggregates changes from all VM instances and creates a minimal set of unique changes. A set of file level changes from multiple change agents are inputted into aggregator module 110 and a tuple (i.e., an ordered list of elements): "<Change, Set of Impacted Images>" that cover all file level changes is generated as an output. Aggregator module 110 may enable the following aggregation process:

1. Create a hash table comprising file level changes and associated VM instances.
2. Cluster the file level changes into semantic changes by merging keys and values in the hash table for which:
   a. All file-level changes comprise a same timestamp in a given VM instance.
   b. VM instances that are impacted by one file level change are also impacted by the additional file level changes in a set.
3. Return all elements in a merged hash table as tuples.

Instance update manager 112 retrieves a set of changes and a version graph as an input and identifies the changes in a version tree. The set of changes may include a set of semantic changes from aggregator module 110 and a current version graph. Instance update manager 112 generates a set of changes in the current version graph (e.g., new nodes, edges and deletion of previous nodes and edges, etc). Instance update manager 112 may enable the following process for each VM instance impacted by each semantic change:

1. Locate a highest depth node V that comprises a VM instance.
2. If an edge exists at depth node V that contains a semantic change, mark its dependent as V', else create a new node V' with edge (V, V') denoting the semantic change.
3. Add the VM instance to V'.

Version manager module 118 applies any changes to a version graph. Image change agent module 120 (located within image library 122) tracks any changes to golden master image 127 and transmits the changes to image update manager module 114. Image update manager module 114 identifies updates in a version graph to capture any golden master image changes. Image update manager module 114 retrieves a set C of file-level changes within golden master image 127. In response, a set of changes in the version graph (e.g., new nodes, edges and deletion of previous nodes and edges, etc) is generated as an output. Image update manager module 114 may enable the following process:

1. Performing a breadth first search on a version graph to identify a cut on the graph such that each edge in the cut comprises all elements in set C.
2. Splitting each node that immediately follows the cut into two nodes: V1 and V2, where node V1 captures changes in set C and node V2 captures changes not in set C.
3. Promoting node V1 to a root node.

Mapping system 104 generates a mapping between golden master image 127 and all generated VM instances 105a . . . 105n generated from golden master image 127. The mapping comprises:

1. A data table that comprising unique changes from golden master image 127.
2. A version tree linking a drift of VM instances to the data table.

Method

Mapping system 104 monitors all changes across multiple VM instances and ensures that data is only copied on a first change.

Figure 2:
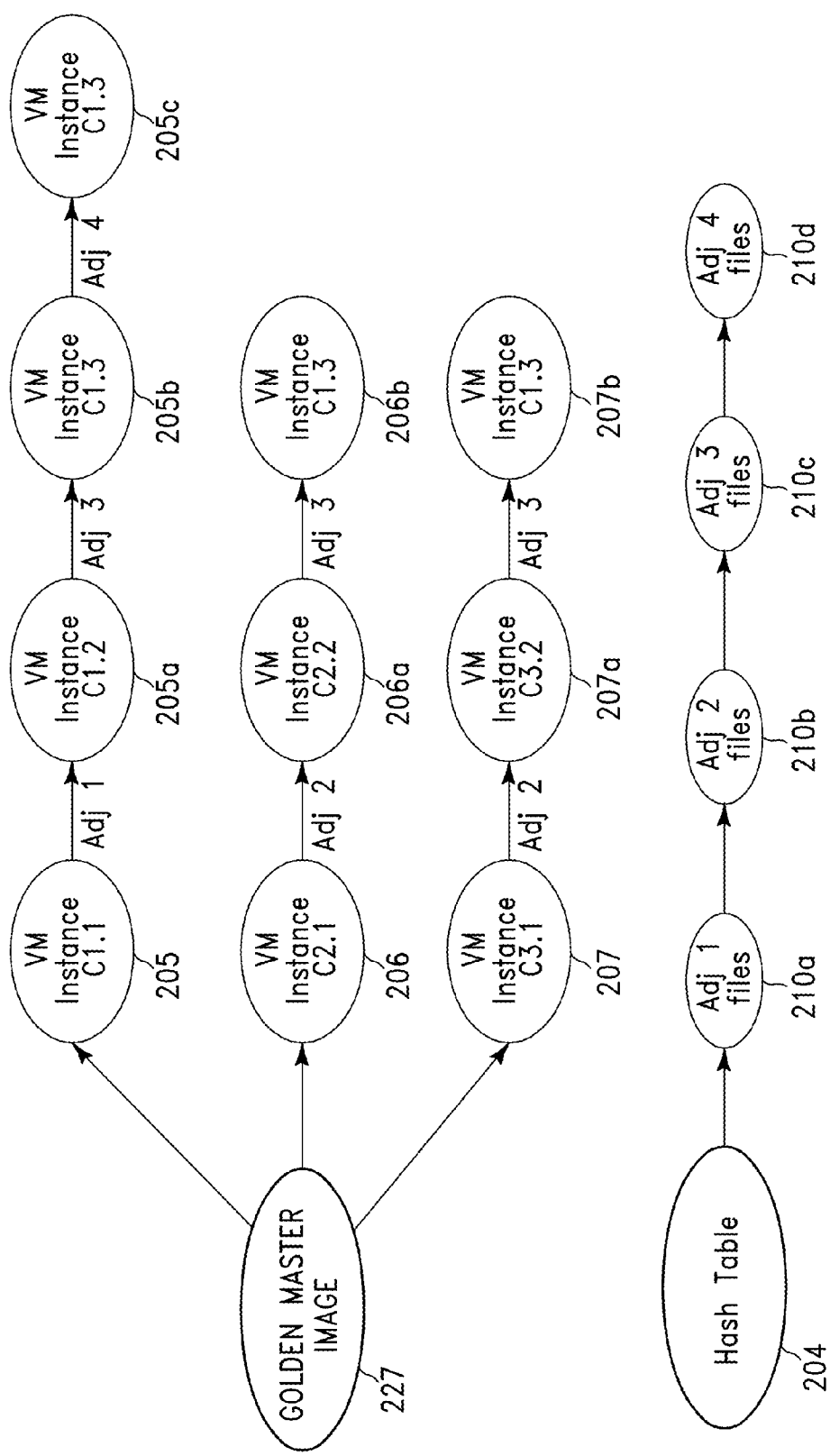
FIG. 2 illustrates an example of VM instance drift, in accordance with embodiments of the present invention.

FIG. 2 illustrates an example of VM instance drift, in accordance with embodiments of the present invention. Each of VM instances 205, 206, and 207 comprise an original VM instance created from golden master image 227. Each of VM instances 205a, 206a, and 207a comprise modified versions of original VM instances 205, 206, and 207, respectively. For example, an Adj. 1 has been applied to VM instance 205 in order to generate VM instance 205a. Each of Adj. 1, Adj 2, Adj. 3, and Adj. 4 may be applied once or several times to any of VM instances 205, 206, and 207 and/or modified VM instances 205a, 206a, 207a, 205b, 206b, 207b, and/or 205c. A hash table 204 comprises a single copy of each of Adj (update) files 210a . . . 210d used to modify VM instances 205, 206, and 207 and/or modified VM instances 205a, 206a, 207a, 205b, 206b, 207b, and/or 205c.

FIG. 3 illustrates an example of a hash table 300, in accordance with embodiments of the present invention. Hash table 300 illustrates VM instance drift updates for each VM instance that has been modified since a previous update. The following process illustrates an update process associated with hash table 300:

1. Determine if an entry exists for an updated VM instance in hash table 300.
   a. If an entry exists for a current VM instance, an entry is updated with a new update file.
   b. If an entry exists for a different VM instance, a checksum of an update file in hash table 300 is compared to a current update file. If the updates files are determined to be the same, an instance id or update id is added to the entry or a new entry is added.

c. If an entry does not exist for any VM instance, a new entry is added.

Hash table 300 allows for a disaster recovery process to be performed by starting from a golden master image and applying each update file in the update hash table for each VM instance. If a patch (i.e., an update) is applied to the golden master image, then any updates applied to the individual VM instances are not recorded in the hash table 300. Only a difference between a VM instance and the golden master image is recorded in hash table 300. Additionally, any files in hash table 300 that are overwritten by a patch are removed.

Figure 4:
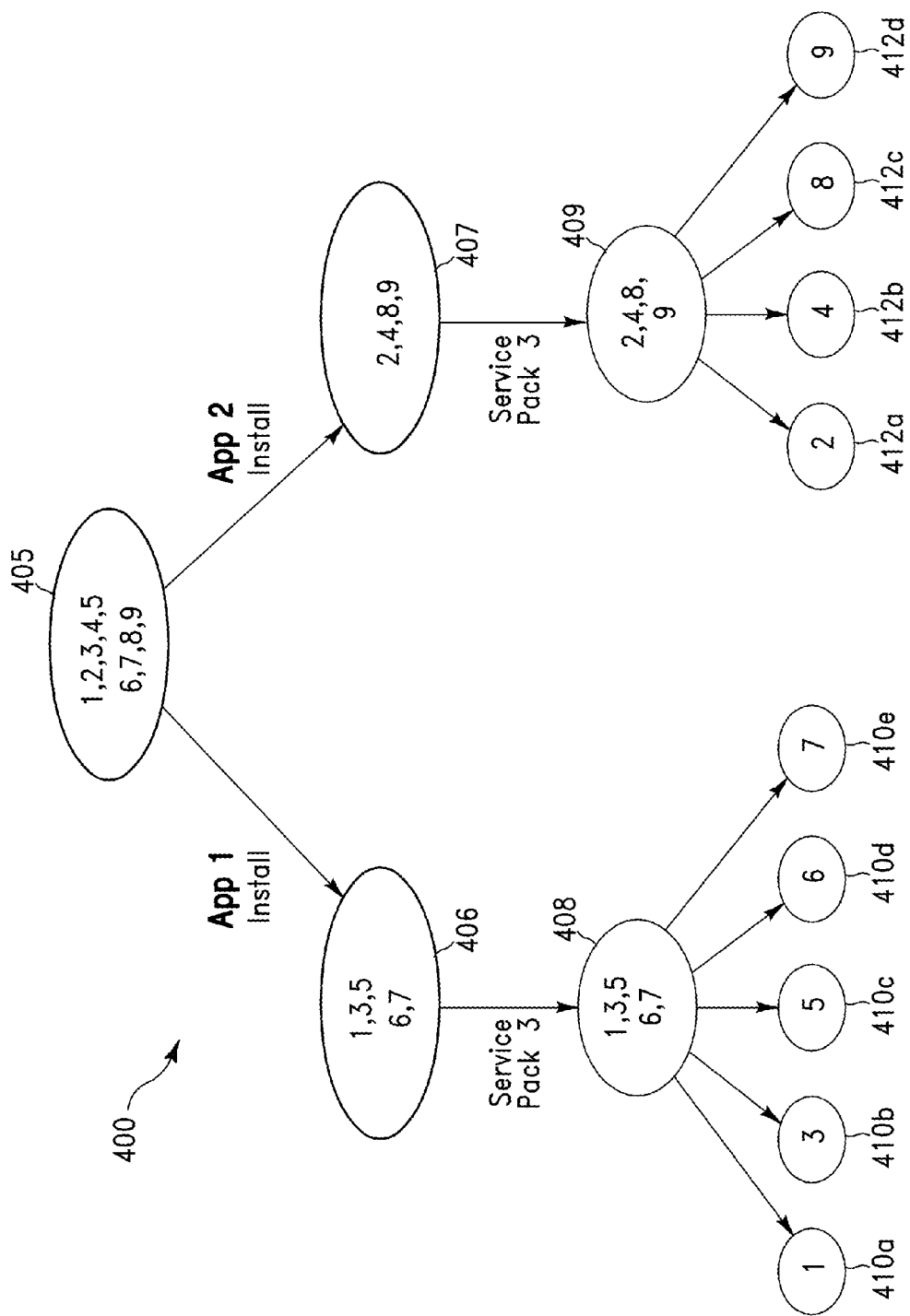
FIG. 4 illustrates an example of an instance version tree, in accordance with embodiments of the present invention.

FIG. 4 illustrates an example of an instance version tree 400, in accordance with embodiments of the present invention. Instance version tree 400 comprises multiple levels comprising VM instance nodes 405-412*d*.

Figure 5:
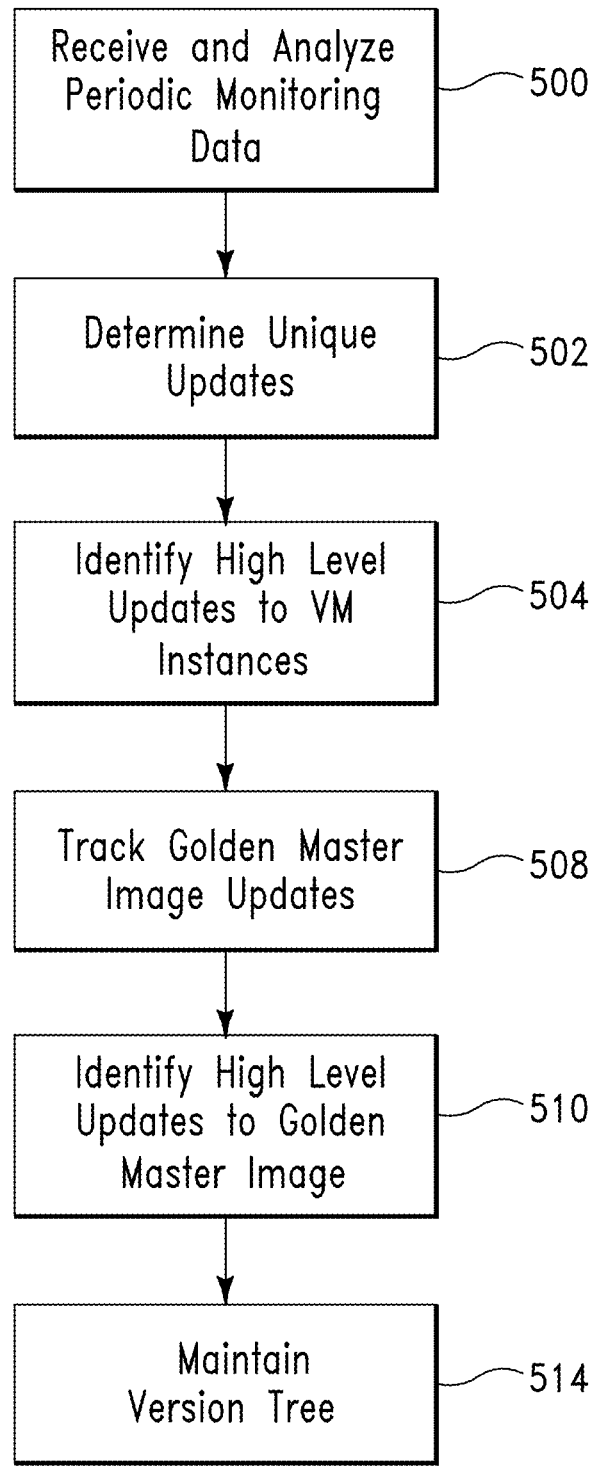
FIG. 5 illustrates an algorithm detailing a process flow enabled by the system of FIG. 1 for maintaining a bidirectional link between a golden master image and generated virtual machine (VM) instances, in accordance with embodiments of the present invention.

FIG. 5 illustrates an algorithm detailing a process flow enabled by system 100 of FIG. 1 for maintaining a bidirectional link between a golden master image and generated VM instances, in accordance with embodiments of the present invention. In step 500, a computer processor executing an aggregator module of a mapping application/system, receives (from a plurality of change agents on a plurality of virtual machine instances) periodic monitoring data indicating changes for each virtual machine instance. Generating the periodic monitoring data may include:

1. Determining disk or file system changes to each virtual machine instance within a specified time period.
2. Generating a list specifying the disk or file system changes.
3. Sorting the disk or file system changes based on a time and location.
4. Generating a hash for each change file of the disk or file system changes.
5. Transmitting each hash to an aggregator module.

Additionally, the computer processor analyzes the periodic monitoring data. In step 502, the computer processor executing the aggregator module determines (based on results of the analyses of step 500) unique updates applied to the plurality of virtual machine instances. Determining the unique updates may include:

1. Generating a hash-table comprising each hash.
2. Clustering changes to the plurality of virtual machine instances into semantic changes by merging keys and values in the hash table. The keys and values may be associated with changes comprising a same time stamp in a given virtual machine instance. Additionally, the keys and values are may be associated with a group of virtual machine instances impacted by similar changes.
3. Returning all elements in the hash-table as tuples.
4. Comparing a checksum of a file in each hash to a current file.

In step 504, the computer processor (executing an instance update manager of the mapping application) identifies high level semantic updates to the plurality of virtual machine instances. In step 508, the computer processor (executing a change agent of the mapping application) tracks updates associated with a golden master image used to generate the plurality of virtual machine instances. In step 510, the computer processor (executing an image update manager of the mapping application) identifies high level semantic updates to the golden master image. The high level semantic updates to the golden master image may be identified by:

1. Performing a breadth-first search on a version graph to identify a cut on the version graph such that each edge in the cut comprises all elements of the high level semantic updates.
2. Splitting a node that immediately follows the cut into a node V1 and a node V2. The node V1 captures changes of the high level semantic updates. The node V2 captures changes not in the high level semantic updates.
3. Promoting the node V1 to a root.

In step 514, the computer processor (executing a version manager of the mapping application) maintains (in response to results of steps 504, 508, and 510) a version tree configured to track drift of each virtual machine instance with respect to the golden master image.

Figure 6:
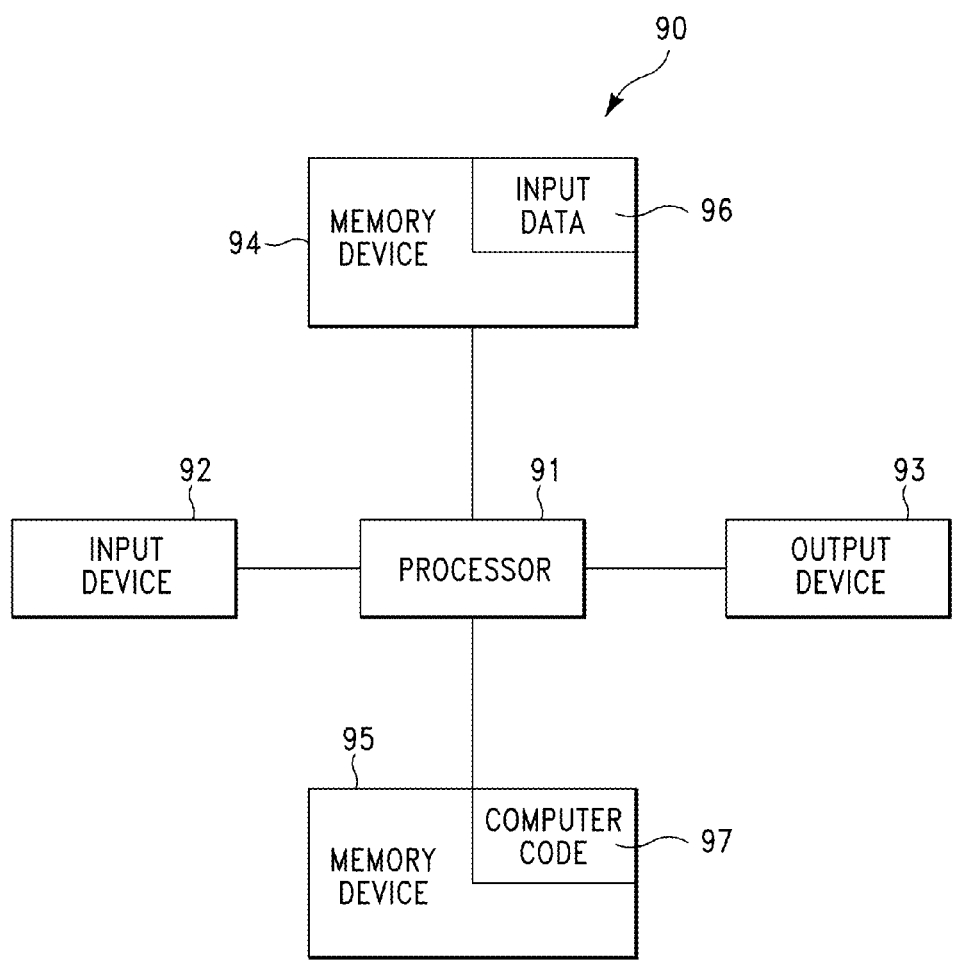
FIG. 6 illustrates a computer apparatus used by the system of FIG. 1 for maintaining a bidirectional link between a golden master image and generated virtual machine (VM) instances, in accordance with embodiments of the present invention.

FIG. 6 illustrates a computer apparatus 90 used by system 100 of FIG. 1 (e.g., mapping system 104 of FIG. 1) for maintaining a bidirectional link between a golden master image and generated VM instances, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 5) for maintaining a bidirectional link between a golden master image and generated VM instances. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithm of FIG. 5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to maintain a bidirectional link between a golden master image and generated VM instances. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for maintaining a bidirectional link between a golden master image and generated VM instances. In another embodiment, the invention provides a business method that performs the process steps of the invention on a subscription, advertising, and/or fee basis. That is, a service supplier, such as a Solution Integrator, could offer to maintain a bidirectional link between a golden master image and generated VM instances. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:

receiving from a plurality of change agents on a plurality of virtual machine instances, by a computer processor executing an aggregator module of a mapping application, periodic monitoring data indicating changes for each virtual machine instance of said plurality of virtual machine instances;

analyzing, by said computer processor executing said aggregator module, said periodic monitoring data;

determining based on results of said analyzing, by said computer processor executing said aggregator module, unique updates applied to said plurality of virtual machine instances;

first identifying, by said computer processor executing an instance update manager of said mapping application, first high level semantic updates to said plurality of virtual machine instances;

tracking, by said computer processor executing a change agent of said mapping application, updates associated with a golden master image used to generate said plurality of virtual machine instances;

second identifying, by said computer processor executing an image update manager of said mapping application, high level semantic updates to said golden master image, wherein said second identifying comprises:

performing a breadth-first search on a version graph to identify a cut on the version graph such that each edge in said cut comprises all elements of said high level semantic updates;

splitting a node that immediately follows said cut into a node V1 and a node V2, wherein said node V1 captures changes of said high level semantic updates, and wherein said node V2 captures changes not in said high level semantic updates; and promoting said node V1 to a root; and maintaining in response to results of said first identifying, said tracking and said second identifying, by said computer processor executing a version manager of said mapping application, a version tree configured to track drift of each said virtual machine instance with respect to said golden master image.

2. The method of claim 1, wherein generating said periodic monitoring data comprises:

determining disk or file system changes to each said virtual machine instance within a specified time period;

generating a list specifying said disk or file system changes;

sorting said disk or file system changes based on a time and location;

generating a hash for each change file of said disk or file system changes; and transmitting each said hash to said aggregator module.

3. The method of claim 2, wherein said determining said unique updates comprises:

generating a hash-table comprising each said hash;

clustering changes to said plurality of virtual machine instances into semantic changes by merging keys and values in said hash table;

after said merging, returning all elements in said hash-table as tuples.

4. The method of claim 3, wherein said determining said unique updates further comprises:

comparing a checksum of a file in each said hash to a current file.

5. The method of claim 3, wherein said keys and said values are associated with changes comprising a same time stamp in a given virtual machine instance of said virtual machine instances.

6. The method of claim 5, wherein said keys and said values are associated with a group of virtual machine instances of said virtual machine instances impacted by similar changes.

7. The method of claim 1, further comprising:

providing at least one support service for at least one of creating, integrating, hosting, maintaining, and deploying computer-readable code in a computer comprising said computer processor, said code being executed by the computer processor to implement: said receiving, said analyzing, said determining, said first identifying, said tracking, said second identifying, and said maintaining.

8. A computer program product, comprising a computer readable hardware storage device storing a computer readable program code, said computer readable program code comprising an algorithm that when executed by a computer processor of a computing system implements a method, said method comprising:

receiving from a plurality of change agents on a plurality of virtual machine instances, by said computer processor executing an aggregator module of a mapping application, periodic monitoring data indicating changes for each virtual machine instance of said plurality of virtual machine instances;

analyzing, by said computer processor executing said aggregator module, said periodic monitoring data;

determining based on results of said analyzing, by said computer processor executing said aggregator module, unique updates applied to said plurality of virtual machine instances;

first identifying, by said computer processor executing an instance update manager of said mapping application, first high level semantic updates to said plurality of virtual machine instances;

tracking, by said computer processor executing a change agent of said mapping application, updates associated with a golden master image used to generate said plurality of virtual machine instances;

second identifying, by said computer processor executing an image update manager of said mapping application, high level semantic updates to said golden master image, wherein said second identifying comprises:

performing a breadth-first search on a version graph to identify a cut on the version graph such that each edge in said cut comprises all elements of said high level semantic updates;

splitting a node that immediately follows said cut into a node V1 and a node V2, wherein said node V1 captures changes of said high level semantic updates, and wherein said node V2 captures changes not in said high level semantic updates; and promoting said node V1 to a root; and maintaining in response to results of said first identifying, said tracking and said second identifying, by said computer processor executing a version manager of said mapping application, a version tree configured to track drift of each said virtual machine instance with respect to said golden master image.

9. The computer program product of claim 8, wherein generating said periodic monitoring data comprises:

determining disk or file system changes to each said virtual machine instance within a specified time period;

generating a list specifying said disk or file system changes;

sorting said disk or file system changes based on a time and location;

generating a hash for each change file of said disk or file system changes; and transmitting each said hash to said aggregator module.

10. The computer program product of claim 9, wherein said determining said unique updates comprises:

generating a hash-table comprising each said hash;

clustering changes to said plurality of virtual machine instances into semantic changes by merging keys and values in said hash table;

after said merging, returning all elements in said hash-table as tuples.

11. The computer program product of claim 10, wherein said determining said unique updates further comprises:

comparing a checksum of a file in each said hash to a current file.

12. The computer program product of claim 10, wherein said keys and said values are associated with changes comprising a same time stamp in a given virtual machine instance of said virtual machine instances.

13. The computer program product of claim 12, wherein said keys and said values are associated with a group of virtual machine instances of said virtual machine instances impacted by similar changes.

14. A computer system comprising a computer processor coupled to a computer-readable memory unit, said memory unit comprising instructions that when executed by the computer processor implements a method comprising:

receiving from a plurality of change agents on a plurality of virtual machine instances, by said computer processor executing an aggregator module of a mapping application, periodic monitoring data indicating changes for each virtual machine instance of said plurality of virtual machine instances;

analyzing, by said computer processor executing said aggregator module, said periodic monitoring data;

determining based on results of said analyzing, by said computer processor executing said aggregator module, unique updates applied to said plurality of virtual machine instances;

first identifying, by said computer processor executing an instance update manager of said mapping application, first high level semantic updates to said plurality of virtual machine instances;

tracking, by said computer processor executing a change agent of said mapping application, updates associated with a golden master image used to generate said plurality of virtual machine instances;

second identifying, by said computer processor executing an image update manager of said mapping application, high level semantic updates to said golden master image, wherein said second identifying comprises:

performing a breadth-first search on a version graph to identify a cut on the version graph such that each edge in said cut comprises all elements of said high level semantic updates;

splitting a node that immediately follows said cut into a node V1 and a node V2, wherein said node V1 captures changes of said high level semantic updates, and wherein said node V2 captures changes not in said high level semantic updates; and promoting said node V1 to a root; and maintaining in response to results of said first identifying, said tracking and said second identifying, by said computer processor executing a version manager of said mapping application, a version tree configured to track drift of each said virtual machine instance with respect to said golden master image.

15. The computer system of claim 14, wherein generating said periodic monitoring data comprises:

determining disk or file system changes to each said virtual machine instance within a specified time period;

generating a list specifying said disk or file system changes;

sorting said disk or file system changes based on a time and location;

generating a hash for each change file of said disk or file system changes; and transmitting each said hash to said aggregator module.

16. The computer system of claim 15, wherein said determining said unique updates comprises:

generating a hash-table comprising each said hash;

clustering changes to said plurality of virtual machine instances into semantic changes by merging keys and values in said hash table;

after said merging, returning all elements in said hash-table as tuples.

17. The computer system of claim 16, wherein said determining said unique updates further comprises:

comparing a checksum of a file in each said hash to a current file.

18. The computer system of claim 16, wherein said keys and said values are associated with changes comprising a same time stamp in a given virtual machine instance of said virtual machine instances.

* * * * *